United States Patent [19]
Aupperle

[11] Patent Number: 5,730,101
[45] Date of Patent: Mar. 24, 1998

[54] FUEL INJECTOR AND MOTOR BRAKE VALVE MOUNTING ARRANGEMENT FOR AN INTERNAL COMBUSTION ENGINE WITH DIRECT FUEL INJECTION

[75] Inventor: Walter Aupperle, Korb, Germany

[73] Assignee: Mercedes-Benz AG, Stuttgart, Germany

[21] Appl. No.: 768,809

[22] Filed: Dec. 18, 1996

[30] Foreign Application Priority Data

Jan. 9, 1996 [DE] Germany .................. 196 00 562.0

[51] Int. Cl.⁶ .................................................. E02M 57/00
[52] U.S. Cl. ...................................... 123/321; 123/470
[58] Field of Search ................................... 123/321, 324, 123/320, 322, 470

[56] References Cited

U.S. PATENT DOCUMENTS

| | | | |
|---|---|---|---|
| 3,547,087 | 12/1970 | Siegler | 123/321 |
| 3,548,793 | 12/1970 | Richardson | 123/90.12 |
| 5,609,134 | 3/1997 | Schmidt et al. | 123/322 |

FOREIGN PATENT DOCUMENTS

| | | |
|---|---|---|
| 39 04 497 | 1/1990 | Germany . |
| 43 01 935 | 11/1993 | Germany . |
| 43 15 233 | 7/1994 | Germany . |
| 44 45 917 | 12/1995 | Germany . |
| 539624 | 2/1956 | Italy . |

Primary Examiner—Willis R. Wolfe
Assistant Examiner—Hieu T. Vo
Attorney, Agent, or Firm—Klaus J. Bach

[57] ABSTRACT

In a mounting arrangement for mountings a fuel injector and a motor brake valve structure on the cylinder head of an internal combustion engine, wherein the cylinder head has a mounting cavity receiving the fuel injector and a mounting bore receiving a motor brake valve structure, a clamp arm is disposed with its opposite ends on the fuel injector and the motor brake valve structure and a clamp bolt extends through the center portion of the clamp arm and is screwed into the cylinder head for fixing the fuel injector and the motor brake valve structure in their mounting cavitiy and monting bore.

5 Claims, 1 Drawing Sheet

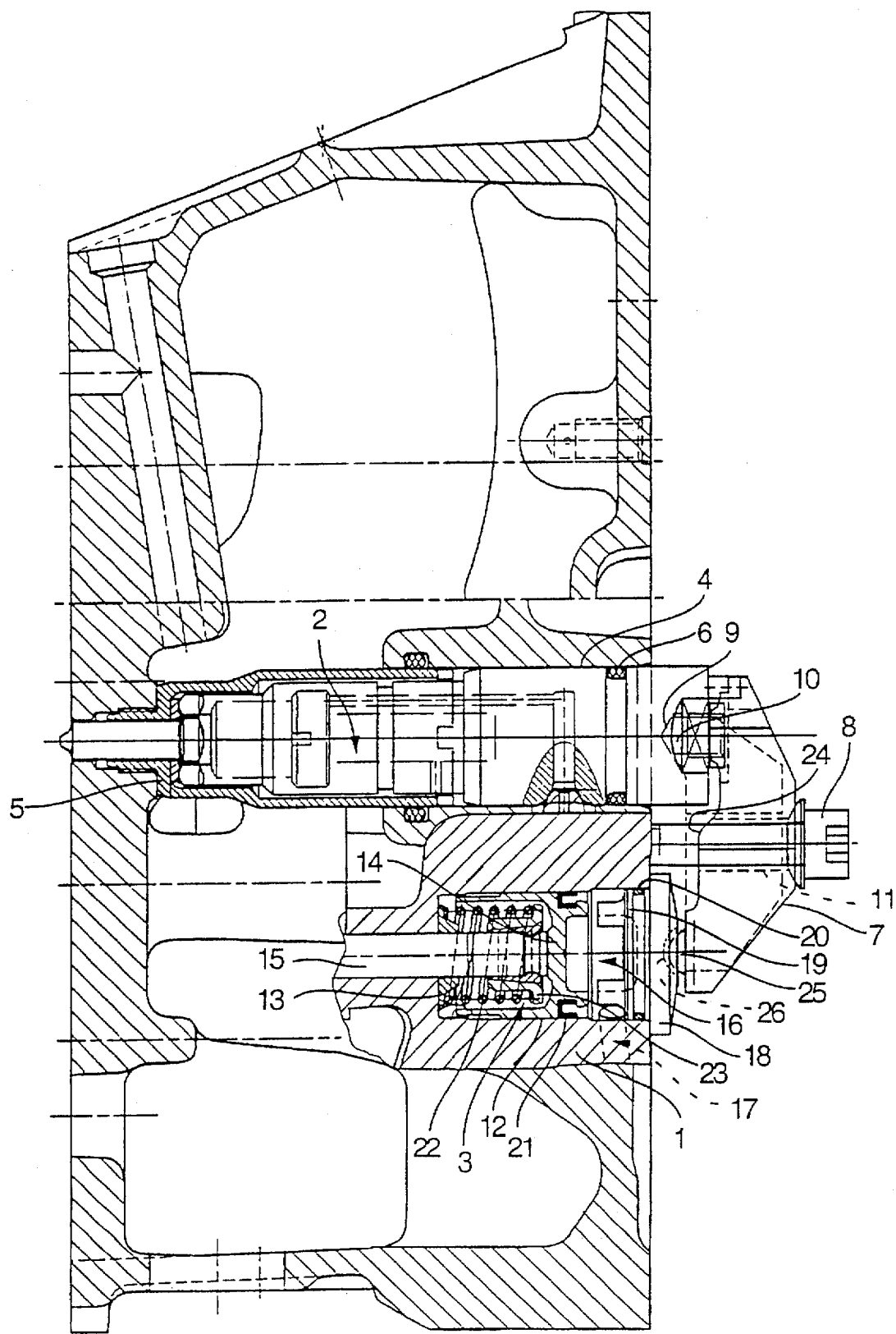

FUEL INJECTOR AND MOTOR BRAKE VALVE MOUNTING ARRANGEMENT FOR AN INTERNAL COMBUSTION ENGINE WITH DIRECT FUEL INJECTION

BACKGROUND OF THE INVENTION

The invention relates to an internal combustion engine with direct fuel injection having a fuel injector disposed in a reception cavity formed in the cylinder head in which the injector is seated by a hold-down clamp mounted on the cylinder head.

DE 43 15 233 A1 discloses such an internal combustion engine with direct fuel injection wherein an injector is disposed in a reception cavity and is held in position by way of clamping means.

It is the object of the present invention to provide an internal combustion engine wherein not only a fuel injector but also a motor brake valve is arranged in the cylinder head and both are firmly held in position.

SUMMARY OF THE INVENTION

In a mounting arrangement for mountings a fuel injector and a motor brake valve structure on the cylinder head of an internal combustion engine, wherein the cylinder head has a mounting cavity receiving the fuel injector and a mounting bore receiving the motor brake valve structure, a clamp arm is disposed with its opposite ends on the fuel injector and the motor brake valve structure and a clamp bolt extends through the center portion of the clamp arm and is screwed into the cylinder head for fixing the fuel injector and the motor brake valve structure in their mounting cavity and mounting bore.

With the arrangement according to the invention the weight and expenses are reduced since only a single component is used for fixing the two devices and also the mounting procedure is simplified.

Various features and advantages of the invention will become apparent from the following description of the invention on the basis of the accompanying drawings.

BRIEF DESCRIPTION OF THE DRAWINGS

The sole FIGURE is a cross-sectional view of the cylinderhead of an internal combustion engine with direct fuel injection.

DESCRIPTION OF A PREFERRED EMBODIMENT

The cylinder head 1 of an internal combustion engine with direct fuel injection includes a fuel injector 2 and also a motor brake valve 3. By way of the fuel injector 2 fuel is injected directly into the combustion chamber (not specifically shown) of the internal combustion engine. Motor brake valves are well known in the art. They are used for increasing the engine braking effect during engine idle, that is, when the engine is driven by the vehicle wheels. To this end, a motor brake valve is opened at the end of the compression stroke of a piston so that the compressed gas is discharged, by throttling, from the cylinder before the beginning of the engine exhaust stroke whereby the energy contained in the compressed gas is destroyed and energy is consumed during downward movement of the piston for the expansion of the gas remaining in the combustion chamber. The operation principles of the injector and of the engine brake valve are well known in the art and are therefore not described in detail. For the reception of the fuel injector 2 the cylinder head 1 includes a mounting cavity 4 with a seat 5 for supporting the fuel injector 2. For mounting, the fuel injector 2 is inserted into the mounting cavity 4 until it is seated on the seat 5. The particular design of the injector 2 is not subject to the present invention and the injector is therefore not described in detail. Since high pressures are generated in the combustion chamber during operation of the internal combustion chamber, the mounting cavity 4 must be sealed with respect to the environment. For this purpose, a seal ring 6 may be provided for example at the outer circumference of the fuel injector 2. In order to prevent the fuel injector 2 from being lifted off the seat 5, the fuel injector 2 must be fixed in its seated position. To achieve this, a clamp arm 7 is mounted onto the cylinder head 1 by a clamp bolt 8 and the fuel injector 2 has at its end remote from the combustion chamber a recess 9 which receives a centering pin 10 projecting from the clamp arm 7. For mounting the clamp arm 7, the clamp bolt 8 is inserted through a bore 11 in the clamp arm 7 and is screwed into a threaded bore formed in the cylinder head 1.

Adjacent the mounting cavity 4 for the fuel injector 2, the cylinder head 1 includes a mounting bore 12 with a seat 13 for the reception of the engine brake valve 3. In the mounting bore 12, there is a piston 14 which is movably disposed adjacent the shaft 15 of the engine brake valve 3 remote from the combustion chamber. At its upper end remote from the combustion chamber, the valve shaft 15 has a shoulder member 23 which is engaged by a valve spring 22 which is supported on the seat 13 to thereby hold the engine brake valve in a closed position.

The piston 14 delineates at its side remote from the combustion chamber a control space 16 to which oil or air under pressure can be admitted by way of a passage 17. Toward the top side of the cylinder head 1, the control space 16 is sealed by a pressure member 18 which has a neck 19 and a seal ring 20 extending around the neck 19. When the pressure member 18 is installed, the neck 19 extends into the mounting bore 12 so that the seal ring 20 engages the inner surface of the mounting bore 12. Toward the combustion chamber, the control space is sealed by a seal ring 21 which is disposed at the outer circumference of the piston 14. By the admission of oil or air under pressure to the control space 16, the piston 14 is moved downwardly for opening the motor brake valve. When the pressure in the control space 16 is reduced, the motor brake valve is returned by the valve spring 22 to its closed position.

In accordance with the present invention the clamp arm 7 is so mounted on the cylinder head that it engages with its opposite ends the fuel injector 2 as well as the pressure member 18 of the motor brake valve 3. To facilitate this, the clamp arm 7 has a curvature 24 in its center section bending away from the cylinder head 1. Furthermore, both ends of the clamp arm 7 have centering pins 10, 25 which extend into respective recesses 9, 26 formed in the fuel injector 2 and the pressure member 18. The bore 11 for the clamp bolt 8 and the respective threaded bore in the cylinder head 1 is provided in the area of the curvature 24 of the clamp arm 7 so that, when mounted, the clamp arm 7 does not abut the cylinder head 1 in the area of the curvature 24, but is supported exclusively by way of the centering pins 10, 25 on the fuel injector 2 and the pressure member 18. By tightening the clamp bolt 8, both the fuel injector 2 and the motor brake valve 3 can be fixed in their installed position at the same time.

Instead of providing a motorbrake valve 3 as shown in the FIGURE, it is possible of course to pre-assemble the components of the motor brake valve to form a unit and then install the assembled motor brake valve unit 3 in the guide bore 12. In this case, the clamp arm 7 engages the upper front end of the motor brake valve unit.

By a particular design of the centering pins 10, 25 and the fuel injector and the motor brake valve unit, rotation of the fuel injector 2 and of the motor brake valve unit 3 can be prevented. In this case, the centering pins 10, 25 and the respective recesses 9, 26 are not circular but have corresponding shapes so that the pins are positively locked with the fuel injector and the motor brake valve unit when they are engaged in the respective recesses. Both the centering pins 10 and the recess 9 may for example have the shape of a pyramid.

With the arrangement according to the invention, weight as well as expenses can be saved since only one component is needed for fixing the fuel injector and the motor brake valve. Furthermore, assembly is simplified since only one mounting step is required for installing the fuel injector and the motor brake valve unit.

What is claimed is:

1. A mounting arrangement for mounting a fuel injector and a motor brake valve structure on a cylinder head of an internal combustion engine with direct fuel injection, said cylinder head having a mounting cavity receiving said fuel injector and a mounting bore receiving said motor brake valve structure, a clamp arm having opposite ends one disposed on said fuel injector and the other on said motor brake valve structure and a clamp bolt extending through said clamp arm between said fuel injector and said motor brake valve structure and being screwed into said cylinder head for fixing said fuel injector and said motor brake valve structure in position within the respective mounting cavity and mounting bore.

2. An arrangement according to claim 1, wherein said clamp arm is so shaped that, in its installed position, it is in contact at its opposite ends only with said fuel injector and said motor brake structure respectively, and wherein a bore extends through said clamp arm in a center area thereof between said opposite ends with a clamp bolt extending through said bore for forcing said clamp arm onto said fuel injector and said motorbrake valve structure.

3. An arrangement according to claim 1, wherein said clamp arm has centering pins projecting from opposite ends thereof and said fuel injector and said motorbrake valve structure have recesses receiving the respective centering pins.

4. An arrangement according to claim 1, wherein said motor brake valve structure includes a valve with a valve shaft extending into said mounting bore for said motor brake valve structure, a valve spring disposed around said valve shaft and being seated at one end while the other end is in engagement with said valve shaft for holding said motor brake valve in a closed position, a piston movably disposed in said mounting bore and being at one side thereof in contact with said valve shaft and defining at the opposite side thereof a control space, a pressure member disposed in the end of said mounting bore opposite said piston to close said control space and passage means for supplying a fluid under pressure to said control space for moving said piston and opening said valve against the force of said valve spring, said clamp arm holding down said pressure member for sealing said control space.

5. An arrangement according to claim 4, wherein said pressure member includes a neck which extends into said bore and a seal ring extends around said neck to seal said pressure member in said bore.

\* \* \* \* \*